US012763597B2

(12) United States Patent
Gao et al.

(10) Patent No.: US 12,763,597 B2
(45) Date of Patent: Oct. 13, 2026

(54) POWER SUPPLY SYSTEM, AND CONTROL METHOD AND APPARATUS

(71) Applicant: Yinwang Intelligent Technologies Co., Ltd., Shenzhen (CN)

(72) Inventors: Qing Gao, Nanjing (CN); Xin Liu, Suzhou (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/062,516

(22) Filed: Feb. 25, 2025

(65) Prior Publication Data

US 2025/0192603 A1 Jun. 12, 2025

Related U.S. Application Data

(63) Continuation of application No. PCT/CN2023/100439, filed on Jun. 15, 2023.

(30) Foreign Application Priority Data

Aug. 31, 2022 (CN) ......................... 202211056843.4
Oct. 20, 2022 (CN) ......................... 202211289297.9

(51) Int. Cl.
*H02J 9/06* (2006.01)
*B60R 16/03* (2006.01)
*H02J 105/30* (2026.01)

(52) U.S. Cl.
CPC ................ *H02J 9/06* (2013.01); *B60R 16/03* (2013.01); *H02J 2105/30* (2026.01)

(58) Field of Classification Search
CPC ............. H02J 9/06; B60R 16/00; B60L 53/00
See application file for complete search history.

(56) References Cited

U.S. PATENT DOCUMENTS

2003/0011247 A1* 1/2003 Kajiwara ................ H02J 9/005 307/125
2008/0011528 A1* 1/2008 Verbrugge ............... B60K 6/28 180/65.29

(Continued)

FOREIGN PATENT DOCUMENTS

CN 111431230 A 7/2020
JP 2016071427 A 5/2016

*Primary Examiner* — Rexford N Barnie
*Assistant Examiner* — Joseph N Inge
(74) *Attorney, Agent, or Firm* — WOMBLE BOND DICKINSON (US) LLP

(57) ABSTRACT

This application relates to a power supply system, and a control method and apparatus. The power supply system includes a first power supply circuit, a second power supply circuit, and a controller. A first power supply and a load are connected through the first power supply circuit; a second power supply and the load are connected through the second power supply circuit; and the controller is connected to the first power supply circuit and the second power supply circuit, and controls the first power supply circuit and/or the second power supply circuit to be connected. An output current of the first power supply circuit is a first current when the first power supply circuit is connected, and an output current of the second power supply circuit is a second current when the second power supply circuit is connected. The first current is less than the second current.

17 Claims, 10 Drawing Sheets

(56) References Cited

U.S. PATENT DOCUMENTS

| | | | | |
|---|---|---|---|---|
| 2009/0184582 | A1* | 7/2009 | Hwang | H02J 1/10 307/64 |
| 2011/0037324 | A1* | 2/2011 | Perper | G06F 1/26 307/140 |
| 2017/0259803 | A1* | 9/2017 | Khafagy | B60W 10/08 |
| 2019/0372363 | A1* | 12/2019 | Cutcher | G06F 1/263 |
| 2020/0198562 | A1* | 6/2020 | Uchimura | B60R 16/03 |

* cited by examiner

POWER SUPPLY SYSTEM, AND CONTROL METHOD AND APPARATUS

This application is a continuation of International Application No. PCT/CN2023/100439, filed on Jun. 15, 2023, which claims priorities to Chinese Patent Application No. 202211056843.4, filed with the China National Intellectual Property Administration on Aug. 31, 2022 and entitled "POWER SUPPLY SYSTEM, AND CONTROL METHOD AND APPARATUS", and to Chinese Patent Application No. 202211289297.9, filed with the China National Intellectual Property Administration on Oct. 20, 2022 and entitled "POWER SUPPLY SYSTEM, AND CONTROL METHOD AND APPARATUS", which are incorporated herein by reference in their entireties.

TECHNICAL FIELD

This application relates to the field of automobile technologies, and in particular, to a power supply system, and a control method and apparatus.

BACKGROUND

With the rapid development of economy, vehicles gradually become common transportation tools in people's daily life. An on-board power supply can supply power to electronic components of the vehicle and is an indispensable component in the vehicle.

After the vehicle is stalled, some functions of some electronic components need to be in a working state, which consumes battery power of the vehicle. Because the battery power is consumed too quickly and too much, the battery is fed and the vehicle can no longer be powered on after the vehicle is stalled. Therefore, the electronic components are required to work in a low power consumption mode, for example, power consumption is in a unit of milliampere (mA).

In the conventional technology, the electronic components are usually powered by using a fuse or a high-side driver (HSD) in a body control module (BCM). The fuse is a passive component and cannot intelligently monitor a current, voltage, and other parameters passing through the fuse. Therefore, intelligent protection cannot be implemented. The HSD is an active component. When the HSD works normally, it consumes a particular amount of power. Therefore, if the HSD works normally after the vehicle is stalled, a large current is required; if the HSD hibernates, the electronic components cannot be powered. How to supply a small current to the electronic components after the vehicle is stalled becomes an urgent problem to be solved.

SUMMARY

In view of this, a power supply system, and a control method and apparatus are provided, which can implement smooth switching between a large current and a small current.

According to a first aspect, an embodiment of this application provides a power supply system. The power supply system includes a first power supply circuit, a second power supply circuit, and a controller. A first power supply and a load are connected through the first power supply circuit; a second power supply and the load are connected through the second power supply circuit; and the controller is connected to the first power supply circuit and the second power supply circuit, and controls the first power supply circuit and/or the second power supply circuit to be connected. An output current of the first power supply circuit is a first current when the first power supply circuit is connected, and an output current of the second power supply circuit is a second current when the second power supply circuit is connected. The first current is less than the second current.

In this embodiment of this application, when power is supplied to the load, smooth switching between a small current and a large current can be implemented, so that a small quiescent current can be supplied to the load, and a large current required for normal working can also be provided to the load.

According to the first aspect, in a first implementation of the power supply system, the power supply system further includes a detection and hold control circuit. The first power supply circuit and the load are connected through the detection and hold control circuit, and the detection and hold control circuit is connected to the controller and the second power supply circuit. The detection and hold control circuit separately sends a first wake-up signal to the controller and the second power supply circuit when detecting that the first current is greater than or equal to a first threshold. The controller enters a working state when receiving the first wake-up signal, and sends a first hibernation signal to the first power supply circuit. The first power supply circuit is disconnected when receiving the first hibernation signal, and the second power supply circuit is connected when receiving the first wake-up signal.

In this embodiment of this application, when the load starts to work normally, the first power supply circuit is disconnected and the second power supply circuit is connected, so that smooth switching from a small current to a large current is implemented. In addition, the second power supply circuit is connected without passing through the controller, which saves connection time of the second power supply circuit, and helps reduce load voltage dip time.

According to the first aspect, in a second implementation of the power supply system, the power supply system further includes a detection and hold control circuit. The first power supply circuit and the load are connected through the detection and hold control circuit, and the detection and hold control circuit is connected to the controller. The detection and hold control circuit sends a first wake-up signal to the controller when detecting that the first current is greater than or equal to a first threshold. The controller enters a working state when receiving the first wake-up signal, and sends a first hibernation signal to the first power supply circuit and a second wake-up signal to the second power supply circuit. The first power supply circuit is disconnected when receiving the first hibernation signal, and the second power supply circuit is connected when receiving the second wake-up signal.

In this embodiment of this application, when the load starts to work normally, the first power supply circuit is disconnected and the second power supply circuit is connected, so that smooth switching from a small current to a large current is implemented. In addition, the detection and hold control circuit does not need to be connected to the second power supply circuit, which helps reduce complexity of the power supply system.

According to the first implementation of the first aspect, in a third implementation of the power supply system, the detection and hold control circuit includes a sampling resistor and a voltage comparator. A first end of the sampling resistor is connected to the first power supply circuit and a first end of the voltage comparator, a second end of the sampling resistor is connected to the load and a second end of the voltage comparator, and a third end of the voltage comparator is connected to the controller and the second power supply circuit. The voltage comparator obtains a first voltage at the first end of the sampling resistor and a second voltage at the second end of the sampling resistor, determines a voltage difference between the first voltage and the second voltage, determines the first current based on the voltage difference and a resistance value of the sampling resistor, and outputs the first wake-up signal to the controller and the second power supply circuit when the first current is greater than or equal to the first threshold.

In this embodiment of this application, current detection is implemented by detecting a voltage difference.

According to the second implementation of the first aspect, in a fourth implementation of the power supply system, the detection and hold control circuit includes a sampling resistor and a voltage comparator. A first end of the sampling resistor is connected to the first power supply circuit and a first end of the voltage comparator, a second end of the sampling resistor is connected to the load and a second end of the voltage comparator, and a third end of the voltage comparator is connected to the controller. The voltage comparator obtains a first voltage at the first end of the sampling resistor and a second voltage at the second end of the sampling resistor, determines a voltage difference between the first voltage and the second voltage, determines the first current based on the voltage difference and a resistance value of the sampling resistor, and outputs the first wake-up signal to the controller when the first current is greater than or equal to the first threshold.

According to a third implementation of the first aspect, in a fifth implementation of the power supply system, the third end of the voltage comparator is connected to the second power supply circuit through a diode or an "OR" circuit.

In this way, the voltage comparator is directly connected to a hardware circuit of the second power supply circuit, enabling the first wake-up signal to reach the second power supply circuit within hundreds of microseconds, so that the power supply system can complete smooth switching between the first power supply circuit and the second power supply circuit within hundreds of microseconds. Thus, voltage dip time of the load is limited to hundreds of microseconds.

According to a fifth implementation of the first aspect, in a sixth implementation of the power supply system, when receiving a second hibernation signal from outside the power supply system, the controller sends a third wake-up signal to the first power supply circuit and a third hibernation signal to the second power supply circuit and enters a hibernation state. The first power supply circuit is connected when receiving the third wake-up signal, and the second power supply circuit is disconnected when receiving the third hibernation signal.

In this embodiment of this application, before entering the hibernation state, the controller switches a large current to a small current, so that after the controller enters the hibernation state, power can still be supplied to the load.

According to the first aspect or any one of the foregoing implementations of the first aspect, in a seventh implementation of the power supply system, the first power supply and the second power supply are a same power supply or different power supplies. In this way, flexibility of the system can be improved.

According to the first aspect or any one of the foregoing implementations of the first aspect, in an eighth implementation of the power supply system, the first power supply circuit includes a metal-oxide-semiconductor field-effect transistor, a triode, a passive switch, or a relay, the second power supply circuit includes a high-side driver, the controller includes a micro control unit.

According to the eighth implementation of the first aspect, in a ninth implementation of the power supply system, the metal-oxide-semiconductor field-effect transistor and the high-side driver are deployed independently, or the metal-oxide-semiconductor field-effect transistor is integrated on a chip to which the high-side driver belongs.

According to the eighth implementation of the first aspect, in a tenth implementation of the power supply system, the second power supply circuit further includes an "OR" circuit. A first input end and a second input end of the "OR" circuit are respectively configured to receive the first wake-up signal and the second wake-up signal, and an output end of the "OR" circuit is connected to the high-side driver. Alternatively, the second power supply circuit further includes a first diode and a second diode, one end of the first diode receives the first wake-up signal, the other end of the first diode is connected to the high-side driver, one end of the second diode receives the second wake-up signal, and the other end of the second diode is connected to the high-side driver.

According to a second aspect, an embodiment of this application provides a control method. The method is applied to a controller, and the method includes: receiving a status adjustment signal, and the status adjustment signal indicates the controller to enter a hibernation state or a working state; and performing status switching and controlling a status of a first power supply circuit and/or a status of a second power supply circuit based on the status adjustment signal. An output current of the first power supply circuit is a first current when the first power supply circuit is connected, an output current of the second power supply circuit is a second current when the second power supply circuit is connected, and the first current is less than the second current.

According to the second aspect, in a first implementation of the method, the performing status switching and controlling a status of a first power supply circuit and/or a status of a second power supply circuit based on the status adjustment signal includes: sending a wake-up signal to the first power supply circuit and a hibernation signal to the second power supply circuit when the status adjustment signal indicates the controller to enter the hibernation state, so that the first power supply circuit is connected and the second power supply circuit is disconnected; and entering the hibernation state.

According to the second aspect, in a second implementation of the method, the performing status switching and controlling a status of a first power supply circuit and/or a status of a second power supply circuit based on the status adjustment signal includes: entering the working state when the status adjustment signal indicates the controller to enter the working state; and sending the hibernation signal to the first power supply circuit and the wake-up signal to the second power supply circuit, so that the first power supply circuit is disconnected and the second power supply circuit is connected.

According to a third aspect, an embodiment of this application provides a control apparatus. The apparatus includes: a receiving module, configured to receive a status adjustment signal, and the status adjustment signal indicates the control apparatus to enter a hibernation state or a working state; and a control module, configured to perform status switching and control a status of a first power supply circuit and/or a status of a second power supply circuit based on the status adjustment signal. An output current of the first power supply circuit is a first current when the first power supply circuit is connected, an output current of the second power supply circuit is a second current when the second power supply circuit is connected, and the first current is less than the second current.

According to the third aspect, in a first implementation of the apparatus, the control module is further configured to: send a wake-up signal to the first power supply circuit and a hibernation signal to the second power supply circuit when the status adjustment signal indicates the control apparatus to enter the hibernation state, so that the first power supply circuit is connected and the second power supply circuit is disconnected; and enter the hibernation state.

According to the third aspect, in a second implementation of the apparatus, the control module is further configured to: enter the working state when the status adjustment signal indicates the control apparatus to enter the working state; and send the hibernation signal to the first power supply circuit and the wake-up signal to the second power supply circuit, so that the first power supply circuit is disconnected and the second power supply circuit is connected.

According to a fourth aspect, an embodiment of this application provides an electronic device. The electronic device may perform one or more of the control methods in the second aspect or the plurality of implementations of the second aspect.

According to a fifth aspect, an embodiment of this application provides a computer program product, including computer-readable code or a nonvolatile computer-readable storage medium that carries computer-readable code. When the computer-readable code is run in an electronic device, a processor in the electronic device performs one or more of the control methods in the second aspect or the plurality of implementations of the second aspect.

According to a sixth aspect, an embodiment of this application provides a nonvolatile computer-readable storage medium. The nonvolatile computer-readable storage medium stores computer program instructions, and when the computer program instructions are executed by a processor, one or more of the control methods in the second aspect or the plurality of implementations of the second aspect are implemented.

According to a seventh aspect, an embodiment of this application provides a vehicle. The vehicle includes a first power supply, a second power supply, a load, and the power supply system according to the first aspect or one or more of the plurality of implementations of the first aspect.

BRIEF DESCRIPTION OF DRAWINGS

The accompanying drawings included in this specification and constituting a part of this specification and this specification jointly show example embodiments, features, and aspects of this application, and are intended to explain principles of this application.

DESCRIPTION OF EMBODIMENTS

Figure 1:
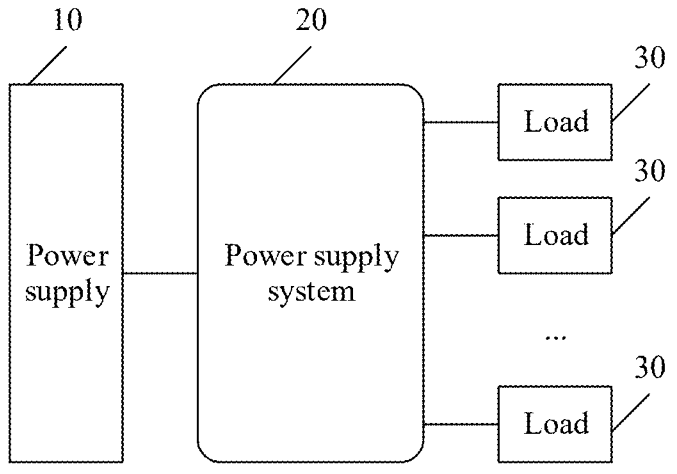
FIG. 1 is a schematic diagram of an application scenario of a power supply system according to this application.

The following describes various example embodiments, features, and aspects of this application in detail with reference to the accompanying drawings. Same reference numerals in the accompanying drawings indicate elements that have same or similar functions. Although various aspects of embodiments are illustrated in the accompanying drawing, the accompanying drawings are not necessarily drawn in proportion unless otherwise specified.

The term “example” herein means “used as an example, embodiment or illustration”. Any embodiment described as an “example” is not necessarily explained as being superior or better than other embodiments.

In addition, to better describe this application, numerous details are provided in the following implementations. A person skilled in the art should understand that this application may also be implemented without details. In some embodiments, methods, means, elements, and circuits that are well-known to a person skilled in the art are not described in detail, so that the subject matter of this application is highlighted.

FIG. 1 is a schematic diagram of an application scenario of a power supply system according to this application. As shown in FIG. 1, a power supply 10 and a load 30 are connected through a power supply system 20. The load 30 may represent electronic components that need to consume power. A vehicle is used as an example. A load includes but is not limited to a vehicle gateway (Vehicle Mounted Gateway, VMGW), a mobile data center (MDC), and a human-machine interaction system (HMI), a telematics control unit (TCU), a telematics box (T-Box), an electronic control unit (ECU), and the like.

The VMGW is a core component in an electronic and electrical architecture of the whole vehicle. As a data interaction hub of a whole vehicle network, the VMGW may route data of a network, for example, a controller area network (CAN), a local interconnection network (LIN), or a media oriented system transport (MOST) network in different networks. The MDC is an intelligent vehicle-mounted computing platform of the vehicle. The MDC can be configured to implement an autonomous driving function of the vehicle. The HMI is an information entertainment system of the vehicle. The TCU and T-Box are mainly configured to communicate with an external device (such as a mobile phone and a background system) of the vehicle. The ECU is a vehicle-type microcomputer controller. The ECU includes but is not limited to a cockpit domain controller (CDC), a vehicle domain controller (VDC), and the like.

The power source 10 may supply constant power. When the power supply system 20 supplies power to the load 30, smooth switching between a small current and a large current can be implemented, so that a small quiescent current can be supplied to the load 30, and a large current required for normal working can also be provided to the load 30. The power supply system 20 includes but is not limited to a body control module (BCM), a vehicle integration unit (VIU), a fuse box, and the like.

The small current is a quiescent current, and a load operating current is in a unit of microampere (μA). The large current is a dynamic current, and a load operating current is in a unit of milliampere (mA).

Figure 2:
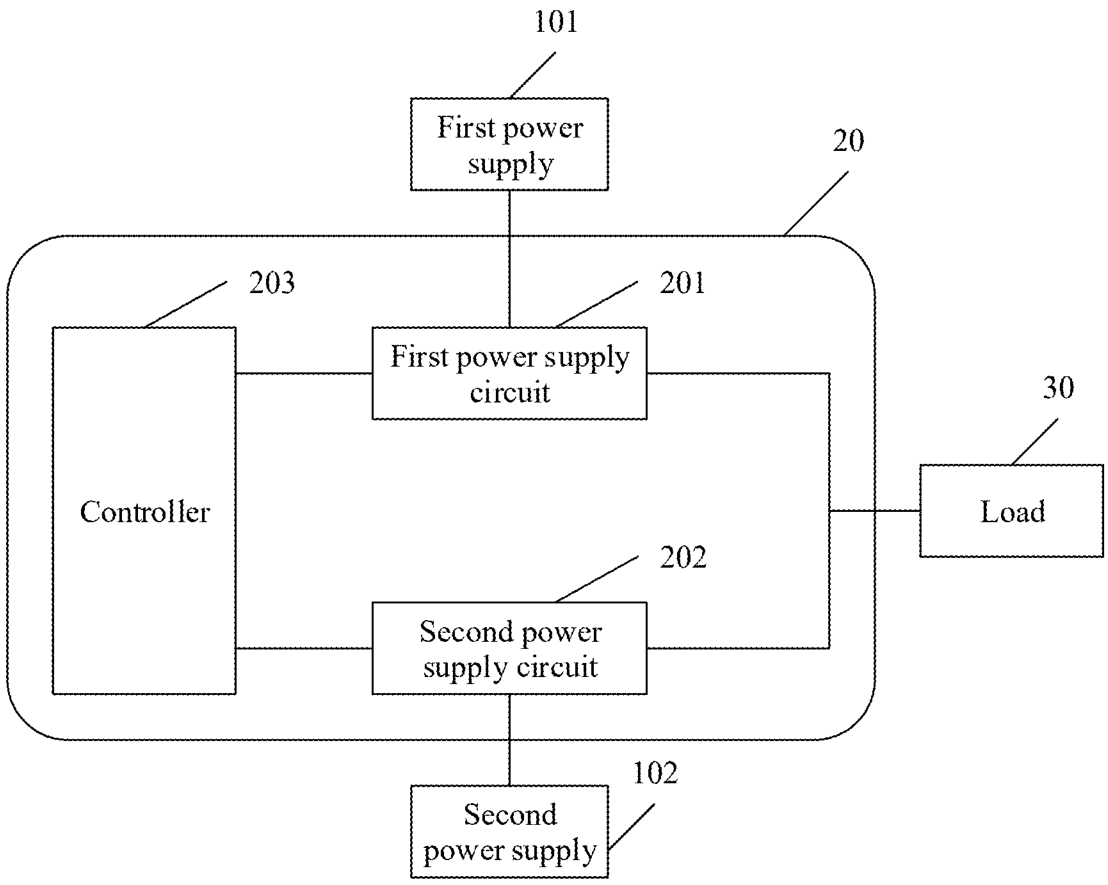
FIG. 2 is a schematic diagram of an architecture of a power supply system according to an embodiment of this application.

FIG. 2 is a schematic diagram of an architecture of a power supply system according to an embodiment of this application. As shown in FIG. 2, the power supply system 20 may include a first power supply circuit 201, a second power supply circuit 202, and a controller 203.

As shown in FIG. 2, the first power supply 101 and the load 30 are connected through the first power supply circuit 201. The second power supply 102 and the load 30 are connected through the second power supply circuit 202. The first power supply 101 and the second power supply 102 may be a same power supply or different power supplies.

As shown in FIG. 2, the controller 203 is connected to the first power supply circuit 201 and the second power supply circuit 202. The controller 203 may control the first power supply circuit 201 and/or the second power supply circuit 202 to be connected.

In this embodiment of this application, an output current of the first power supply circuit 201 is a first current when the first power supply circuit 201 is connected, an output current of the second power supply circuit 202 is a second current when the second power supply circuit 202 is connected, and the first current is less than the second current. A current consumed by the first power supply circuit 201 is small (in a unit of microampere), and a quiescent current supplied by the first power supply circuit 201 is small. In an example, the first current quiescently output by the first power supply circuit 201 may be a current less than 10 microamperes. A current consumed by the second power supply circuit 202 is large (in a unit of milliampere), and the quiescent current supplied by the second power supply circuit 202 is large. In an example, the second current quiescently output by the second power supply circuit 202 may be a current greater than several hundred microamperes. In other words, in the first power supply circuit 201 and the second power supply circuit 202, the first power supply circuit 201 can supply a small quiescent current to the load 30, and the second power supply circuit 202 can supply a large current required for normal working to the load 30.

In an example, the controller 203 includes but is not limited to a micro controller unit (MCU) in the BCM, the MCU in the VIU, or the like. The first power supply circuit 201 may be a metal-oxide-semiconductor field-effect transistor (MOSFET, MOS for short), a triode, a passive switch, a relay, or the like, and the MOS may be a PMOS or an NMOS. The second power supply circuit 202 may include a high-side driver (HSD) and an "OR" circuit or related devices such as two transistors.

It should be noted that the foregoing is merely an example of description of the controller 203, the first power supply circuit 201, and the second power supply circuit 202, and is not intended to limit the controller 203, the first power supply circuit 201, and the second power supply circuit 202 in this embodiment of this application. Alternatively, the controller 203, the first power supply circuit 201, and the second power supply circuit 202 may be other electronic devices.

In an embodiment, the metal-oxide-semiconductor field-effect transistor and the high-side driver are deployed independently, or the metal-oxide-semiconductor field-effect transistor is integrated on a chip to which the high-side driver belongs. A deployment manner of the metal-oxide-semiconductor field-effect transistor and the high-side driver is not limited in this embodiment of this application.

Figure 3:
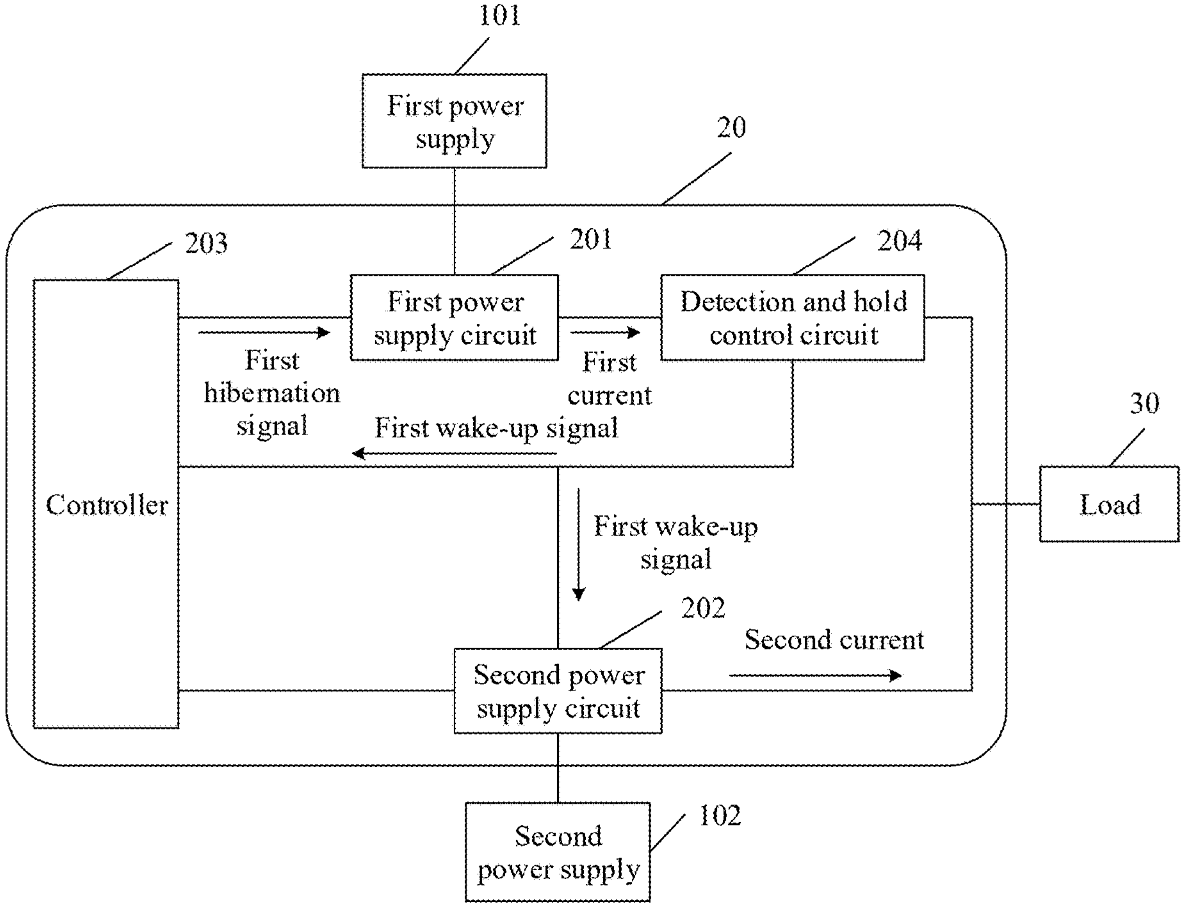
FIG. 3 is a schematic diagram of an architecture of a power supply system according to an embodiment of this application.

FIG. 3 is a schematic diagram of an architecture of a power supply system according to an embodiment of this application. As shown in FIG. 3, based on FIG. 2, the power supply system 20 may further include a detection and hold control circuit 204. The first power supply circuit 201 and the load 30 are connected through the detection and hold control circuit 204, and the detection and hold control circuit 204 is connected to the controller 203 and the second power supply circuit 202.

As shown in FIG. 3, the detection and hold control circuit 204 may detect the first current, and separately send a first wake-up signal to the controller 203 and the second power supply circuit 202 when the first current is greater than a first threshold. The first threshold may be used to determine whether the load 30 starts to work normally. After the load 30 starts to work normally, a current to be consumed increases greatly, and the first current also increases greatly. Therefore, when the first current is greater than the first threshold, it indicates that the load 30 starts to work normally. In this case, a large current needs to be supplied to the load 30. When the first current is less than or equal to the first threshold, it indicates that the load 30 does not start to work normally. In this case, a small current needs to be supplied to the load 30. The first threshold may be set based on a requirement, and the first threshold may be in a unit of microampere. In an example, the first threshold may be set based on a current required when the load 30 works normally. For example, the first threshold may be set to ¼ or ½ of the current required when the load 30 works normally. This is not limited in this embodiment of this application.

In the foregoing embodiment, if the first current is equal to the first threshold, it is considered that the detection and hold control circuit 204 separately sends the first wake-up signal to the controller 203 and the second power supply circuit 202 when the load 30 does not start to work normally. In another embodiment, if the first current is equal to the first threshold, it may also be considered that the detection and hold control circuit 204 separately sends the first wake-up signal to the controller 203 and the second power supply circuit 202 when the load 30 is about to work or has started to work normally.

The first wake-up signal may represent a wake-up signal sent by the detection and hold control circuit 204. The controller 203 enters a working state when receiving the first wake-up signal, and sends a first hibernation signal to the first power supply circuit 201. The first hibernation signal may represent a hibernation signal generated by the controller 203 in response to the first wake-up signal. The first power supply circuit 201 is disconnected when receiving the first hibernation signal. The second power supply circuit 202 is connected when receiving the first wake-up signal. In this way, when the load starts to work normally, the first power supply circuit is disconnected and the second power supply circuit is connected, so that smooth switching from a small current to a large current is implemented.

Figure 4:
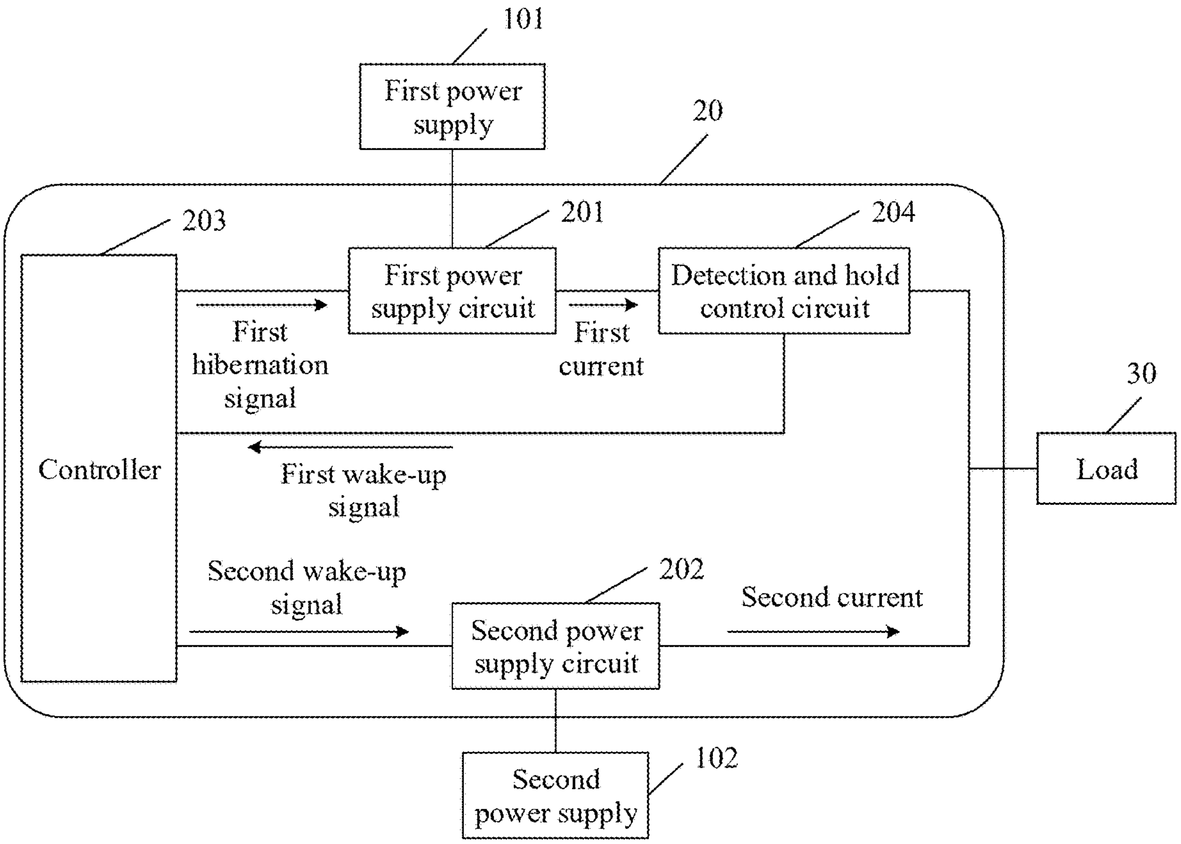
FIG. 4 is a schematic diagram of an architecture of a power supply system according to an embodiment of this application.

FIG. 4 is a schematic diagram of an architecture of a power supply system according to an embodiment of this application. As shown in FIG. 4, based on FIG. 2, the power supply system may further include a detection and hold control circuit 204. The first power supply circuit 201 and the load 30 are connected through the detection and hold control circuit 204, and the detection and hold control circuit 204 is connected to the controller 203.

As shown in FIG. 4, the detection and hold control circuit 204 may detect the first current, and send a first wake-up signal to the controller 203 when the first current is greater than a first threshold. The controller 203 enters a working state when receiving the first wake-up signal, and sends a first hibernation signal to the first power supply circuit 201 and a second wake-up signal to the second power supply circuit 202. The first hibernation signal may represent a hibernation signal generated by the controller 203 in response to the first wake-up signal. The second wake-up signal may represent a wake-up signal generated by the controller 203 in response to the first wake-up signal. The first power supply circuit 201 is disconnected when receiving the first hibernation signal, and the second power supply circuit 202 is connected when receiving the second wake-up signal. In this way, when the load starts to work normally, the first power supply circuit is disconnected and the second power supply circuit is connected, so that smooth switching from a small current to a large current is implemented.

In the foregoing embodiment, if the first current is equal to the first threshold, it is considered that the detection and hold control circuit 204 sends the first wake-up signal to the controller 203 when the load 30 does not start to work normally. In another embodiment, if the first current is equal to the first threshold, it may also be considered that the detection and hold control circuit 204 sends the first wake-up signal to the controller 203 when the load 30 is about to work or has started to work normally.

In an embodiment, the detection and hold control circuit shown in FIG. 3 may be connected to the second power supply circuit through a diode or an "OR" circuit. For example, a third end of a voltage comparator of the detection and hold control circuit may be connected to the second power supply circuit through the diode or the "OR" circuit. (Refer to a first diode in subsequent FIG. 7 or an "OR" circuit in FIG. 8). In this way, the voltage comparator is directly connected to a hardware circuit of the second power supply circuit, enabling the first wake-up signal to reach the second power supply circuit within hundreds of microseconds, so that the power supply system can complete smooth switching between the first power supply circuit and the second power supply circuit within hundreds of microseconds. Thus, voltage dip time of the load is limited to hundreds of microseconds. The diode or the "OR" circuit may be used as a part of the second power supply circuit, or may not be used as a part of the second power supply circuit.

In FIG. 3, when the second power supply circuit 202 is enabled by using the first wake-up signal, the second power supply circuit 202 may be directly enabled by using a hardware circuit. Therefore, the first wake-up signal may enable the second power supply circuit 202 within tens of microseconds. In FIG. 4, when the second power supply circuit 202 is enabled by using the second wake-up signal sent by the controller 203, the second power supply circuit 202 may be enabled by using software control. For example, the MCU is used as the controller 203. In this manner, after a general-purpose input output (GPIO) pin of the MCU receives the first wake-up signal, the MCU wakes up. After the MCU wakes up, the MCU controls the GPIO pin to output the second wake-up signal. This process takes a long time. A valid second wake-up signal needs to be output within tens of microseconds to hundreds of microseconds. It can be learned that, compared with the power supply system shown in FIG. 4, in the power supply system shown in FIG. 3, the second power supply circuit is connected without passing through the controller, which saves connection time of the second power supply circuit, and helps reduce load voltage dip time. Compared with the power supply system shown in FIG. 3, in the power supply system shown in FIG. 4, the detection and hold control circuit does not need to be connected to the second power supply circuit, which helps reduce complexity of the power supply system.

A circuit structure of the detection and hold control circuit is not limited in this embodiment of this application, provided that the detection and hold control circuit in this embodiment of this application can implement functions of detecting the first current, comparing the first current with the first threshold, and generating and sending the first wake-up signal. In an embodiment, the detection and hold control circuit may include a resistor and an operational amplifier, a resistor and a MOS transistor, a resistor and a voltage comparator, a resistor and a triode, or the like.

Figure 5:
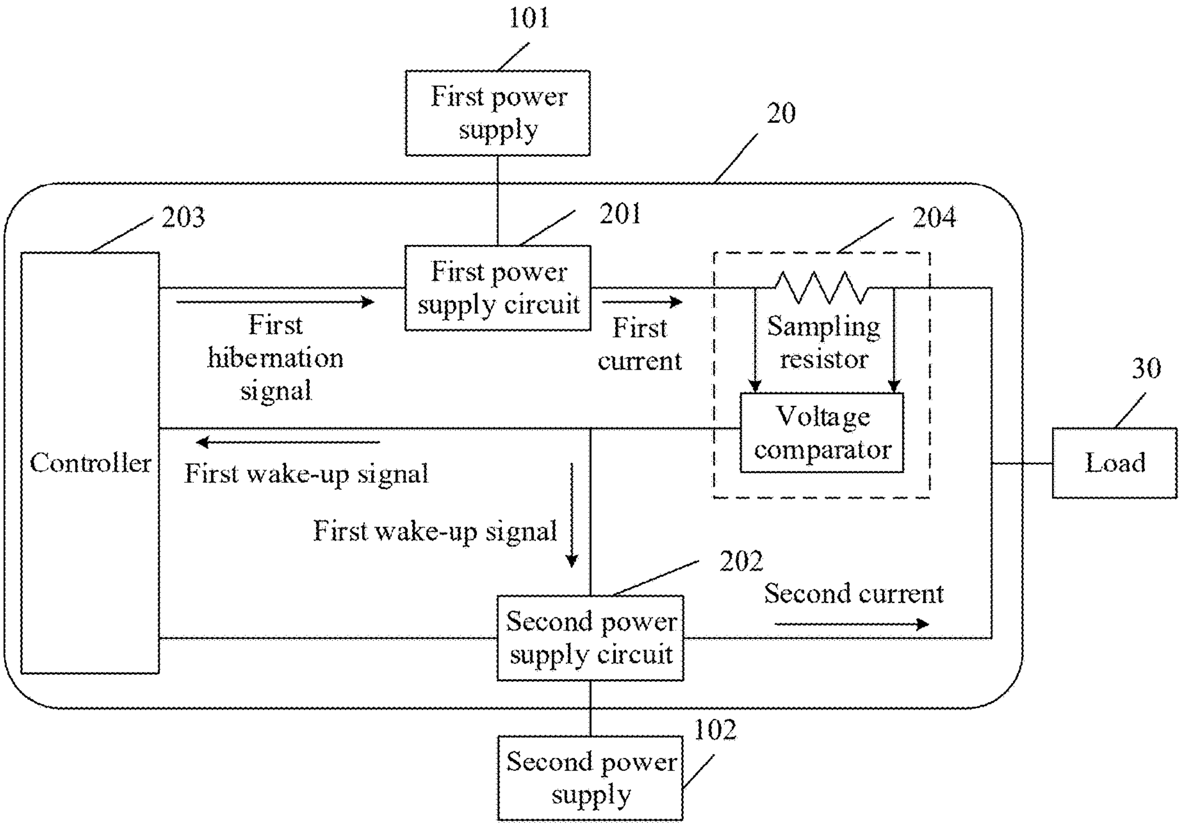
FIG. 5 is a schematic diagram of an example structure of a detection and hold control circuit according to an embodiment of this application.

FIG. 5 is a schematic diagram of an example structure of a detection and hold control circuit according to an embodiment of this application. As shown in FIG. 5, based on FIG. 3, the detection and hold control circuit 204 may include a sampling resistor and a voltage comparator. A first end of the sampling resistor is connected to the first power supply circuit 201 and a first end of the voltage comparator (namely, a first input end of the voltage comparator), a second end of the sampling resistor is connected to the load 30 and a second end of the voltage comparator (namely, a second input end of the voltage comparator), and a third end of the voltage comparator (namely, an output end of the voltage comparator) is connected to the controller 203 and the second power supply circuit 202.

As shown in FIG. 5, the voltage comparator may first obtain a first voltage and a second voltage of the sampling resistor (namely, voltages at both ends of the resistor are used). The first voltage is a voltage at the first end of the sampling resistor (namely, the end connected to the first power supply circuit 201), and the second voltage is a voltage at the second end of the sampling resistor (namely, the end connected to the load 30). Subsequently, the voltage comparator may determine a voltage difference between the first voltage and the second voltage, then determine the first current based on the voltage difference and a resistance value of the sampling resistor, and generate and separately send the first wake-up signal to the controller 203 and the second power supply circuit 202 when the first current is greater than or equal to the first threshold.

The sampling resistor has features of small resistance value and high precision. The sampling resistor usually has a resistance value less than 1 ohm, and is a milliohm-level noninductive resistor.

As shown in FIG. 5, the voltage comparator separately sends the first wake-up signal to the controller 203 and the second power supply circuit 202. The controller 203 enters the working state when receiving the first wake-up signal and sends the first hibernation signal to the first power supply circuit 201. The first hibernation signal may represent a hibernation signal generated by the controller 203 in response to the first wake-up signal. The first power supply circuit 201 is disconnected when receiving the first hibernation signal. The second power supply circuit 202 is connected when receiving the first wake-up signal. In this way, when the load starts to work normally, the first power supply circuit is disconnected and the second power supply circuit is connected, so that smooth switching from a small current to a large current is implemented.

Figure 6:
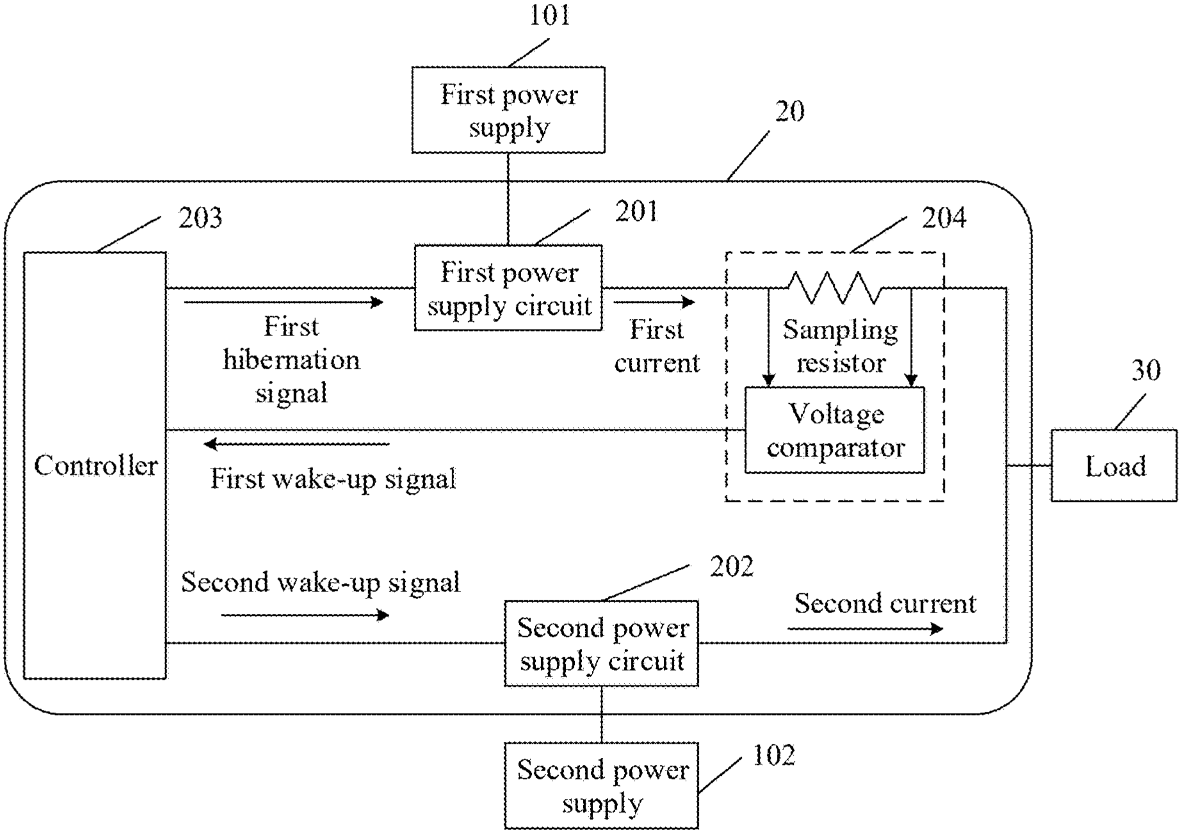
FIG. 6 is a schematic diagram of an example structure of a detection and hold control circuit according to an embodiment of this application.

FIG. 6 is a schematic diagram of an example structure of a detection and hold control circuit according to an embodiment of this application. As shown in FIG. 6, based on FIG. 4, the detection and hold control circuit 204 may include a sampling resistor and a voltage comparator. A first end of the sampling resistor is connected to the first power supply circuit 201 and a first end of the voltage comparator (namely, a first input end of the voltage comparator), a second end of the sampling resistor is connected to the load 30 and a second end of the voltage comparator (namely, a second input end of the voltage comparator), and a third end of the voltage comparator (namely, an output end of the voltage comparator) is connected to the controller 203.

As shown in FIG. 6, the voltage comparator may generate and send the first wake-up signal to the controller 203 when the first current is greater than or equal to the first threshold.

As shown in FIG. 6, the voltage comparator sends the first wake-up signal to the controller 203. The controller 203 enters the working state when receiving the first wake-up signal, and sends the first hibernation signal to the first power supply circuit 201 and the second wake-up signal to the second power supply circuit 202. The first power supply circuit 201 is disconnected when receiving the first hibernation signal, and the second power supply circuit 202 is connected when receiving the second wake-up signal. In this way, when the load starts to work normally, the first power supply circuit is disconnected and the second power supply circuit is connected, so that smooth switching from a small current to a large current is implemented.

In an example, the first wake-up signal may be a level signal of a preset level value. The first wake-up signal may be of a high level or a low level. In other words, the first wake-up signal may be woken up by using a high level or a low level. A level value of the first wake-up signal is not limited, provided that the level value of the first wake-up signal in this embodiment of this application is stable.

In an example, the voltage comparator may generate the first wake-up signal within hundreds of microseconds, enabling the power supply system to complete smooth switching between the first power supply circuit 201 and the second power supply circuit 202 within hundreds of microseconds, so that voltage dip time of the load 30 is limited to hundreds of microseconds.

With reference to FIG. 3 and FIG. 4 or FIG. 5 and FIG. 6, it can be learned that the second power supply circuit 202 may receive the first wake-up signal, or may receive the second wake-up signal. Herein, both the first wake-up signal and the second wake-up signal may enable the second power supply circuit to be connected.

Figure 12:
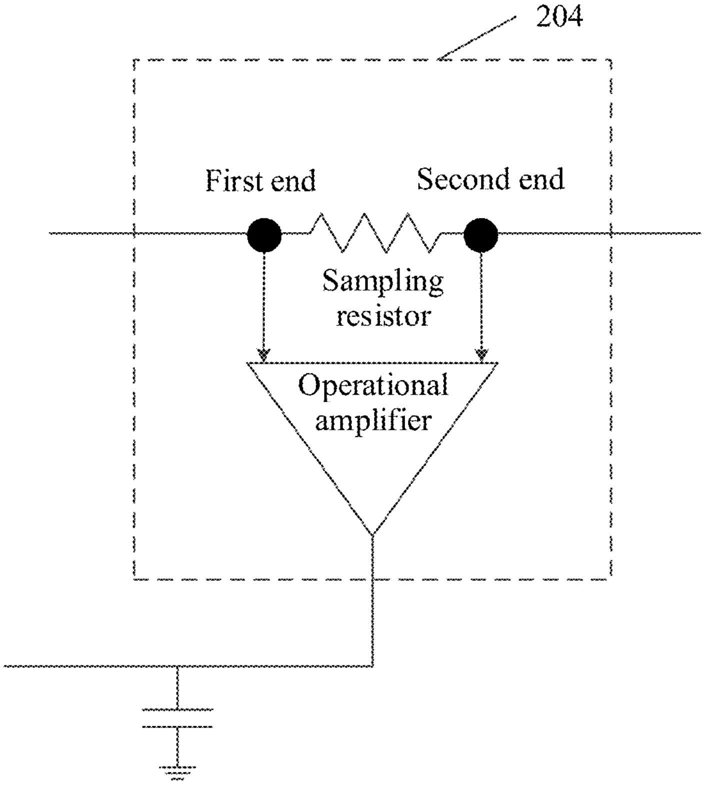
FIG. 12 is a schematic diagram of an example structure of a detection and hold control circuit according to an embodiment of this application.

FIG. 12 is a schematic diagram of an example structure of a detection and hold control circuit according to an embodiment of this application. As shown in FIG. 12, the detection and hold control circuit 204 may include a sampling resistor and an operational amplifier. A first end of the sampling resistor is connected to the first power supply circuit and a first end of the operational amplifier (namely, a first input end of the operational amplifier), a second end of the sampling resistor is connected to the load and a second end of the operational amplifier (namely, a second input end of the operational amplifier), and a third end of the operational amplifier (namely, an output end of the operational amplifier) is connected to the controller and the second power supply circuit (refer to FIG. 5), or to the controller (refer to FIG. 6). In addition, as shown in FIG. 12, the third end of the operational amplifier is further connected to a ground capacitor.

Figure 13:
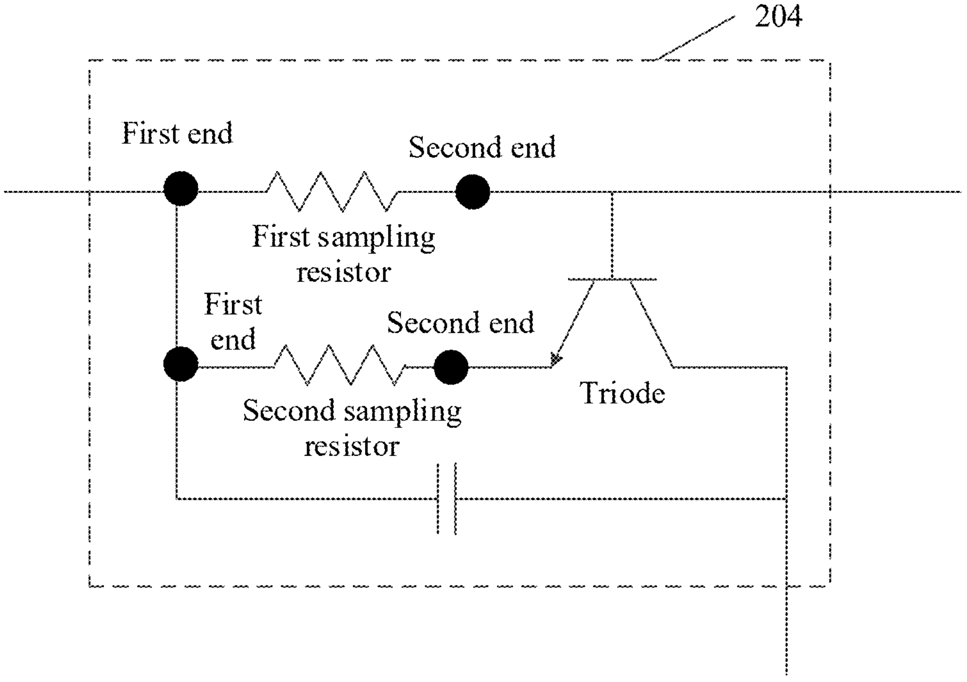
FIG. 13 is a schematic diagram of an example structure of a detection and hold control circuit according to an embodiment of this application.

FIG. 13 is a schematic diagram of an example structure of a detection and hold control circuit according to an embodiment of this application. As shown in FIG. 13, the detection and hold control circuit 204 may include a first sampling resistor, a second sampling resistor, and a triode. A first end of the first sampling resistor is connected to the first power supply circuit and a first end of the second sampling resistor, a second end of the first sampling resistor is connected to the load and a base of the triode, a second end of the second sampling resistor is connected to an emitter of the triode, and a collector of the triode is connected to the controller and the second power supply circuit (refer to FIG. 5), or to the controller (refer to FIG. 6). In addition, as shown in FIG. 13, the collector of the triode is further connected to the first end of the second sampling resistor through a capacitor. The triode shown in FIG. 13 is an NPN-type triode. In this embodiment of this application, the triode included in the detection and hold control circuit may alternatively be a PNP-type triode. The foregoing triode may alternatively be replaced with a field-effect transistor (namely, a MOS transistor), for example, an NMOS transistor or a PMOS transistor.

The foregoing is merely an example structure of the detection and hold control circuit, and is not intended to limit the detection and hold control circuit in embodiments of this application.

Figure 7:
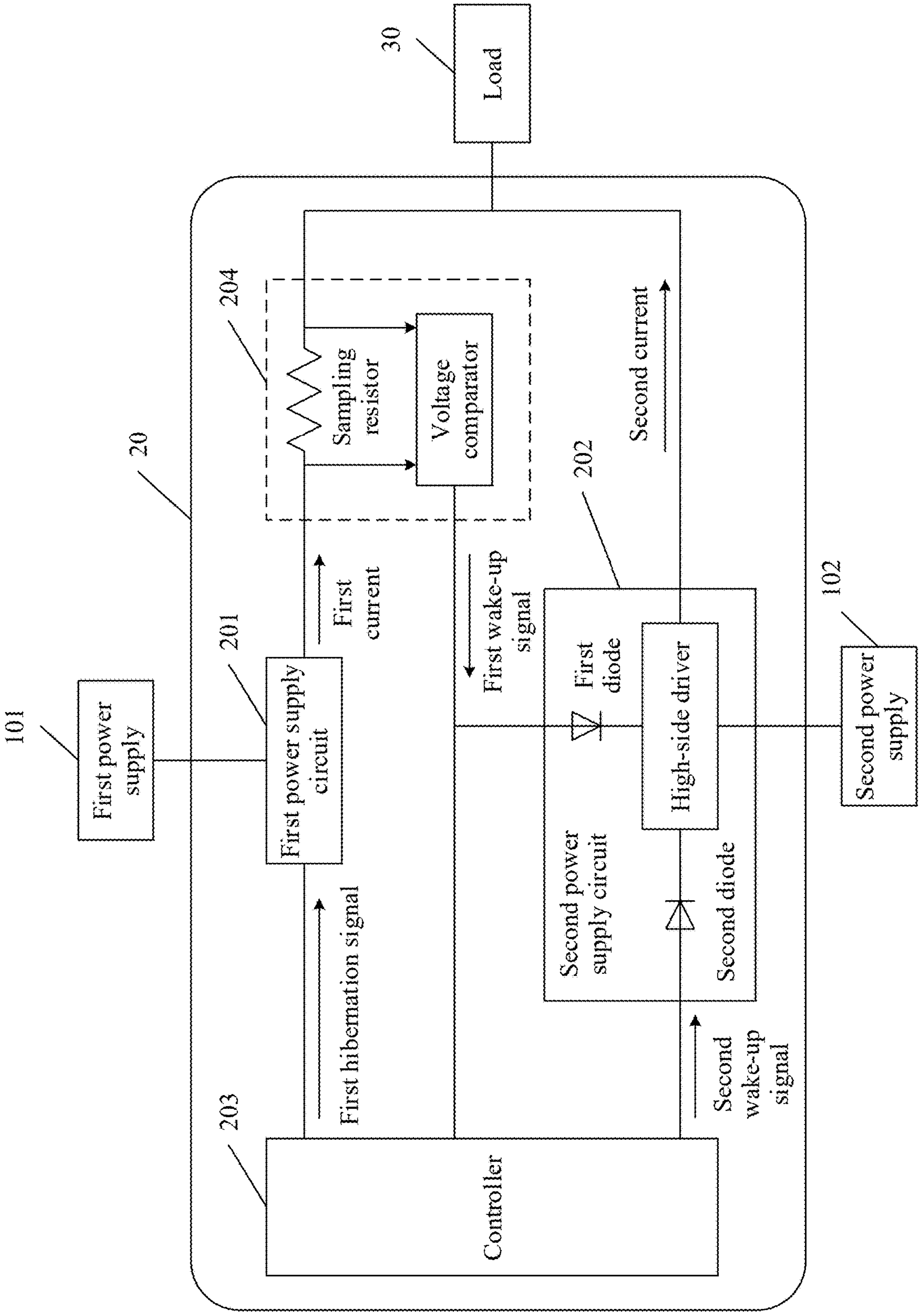
FIG. 7 is a schematic diagram of an architecture of a power supply system according to an embodiment of this application.

FIG. 7 is a schematic diagram of an architecture of a power supply system according to an embodiment of this application. As shown in FIG. 7, the power supply system may further include a first diode and a second diode. The detection and hold control circuit 204 and the second power supply circuit 202 are connected through the first diode, the controller 203 and the second power supply circuit 202 are connected through the second diode, and the second power supply circuit includes a high-side driver. In this way, when there is a first wake-up signal, the second power supply circuit 202 may be connected, and when there is a second wake-up signal, the second power supply circuit may also be connected. Alternatively, the first diode and the second diode may be used as a part of the second power supply circuit 202. In this case, the second power supply circuit includes the high-side driver, the first diode, and the second diode.

Figure 8:
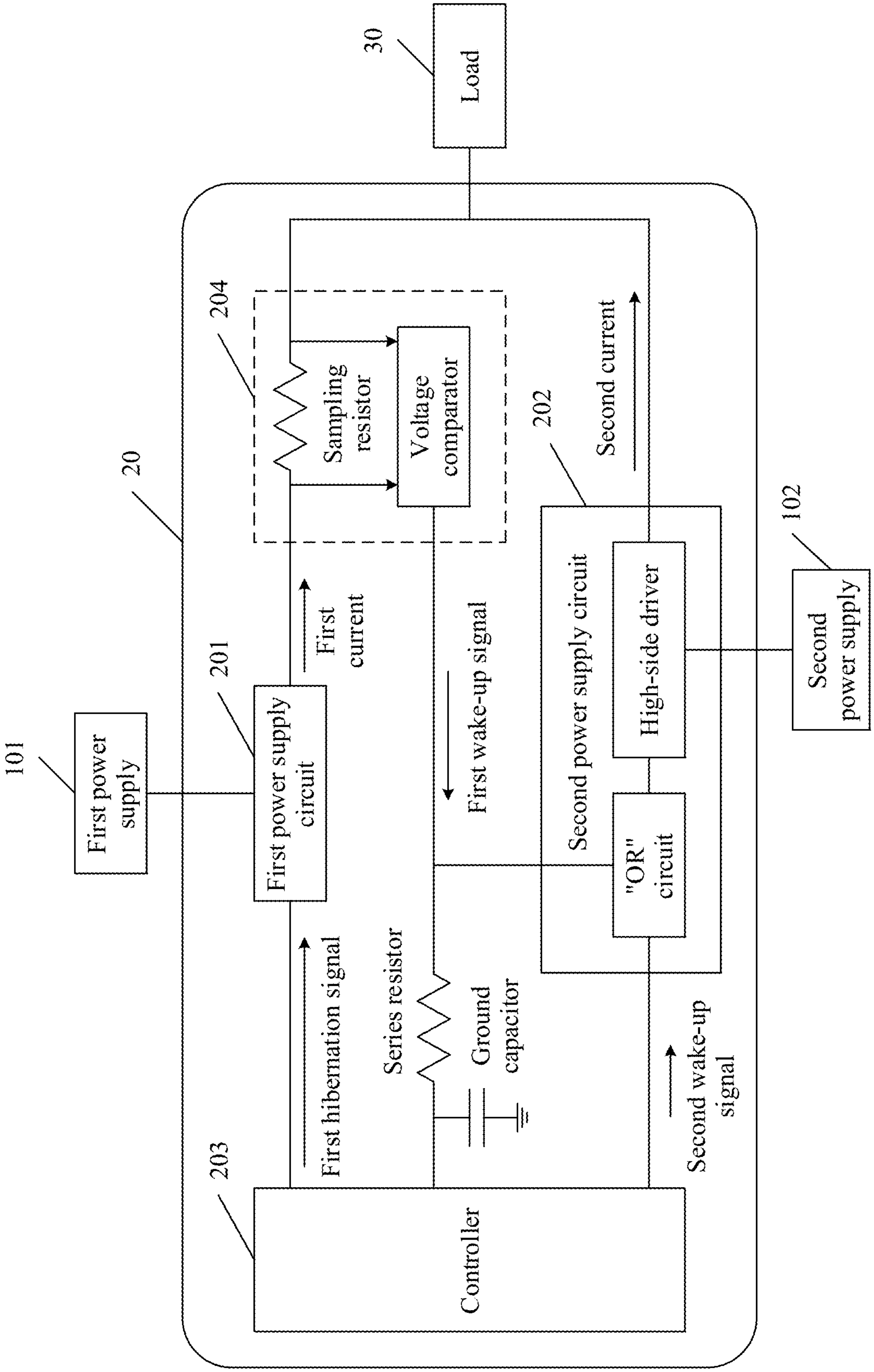
FIG. 8 is a schematic diagram of an architecture of a power supply system according to an embodiment of this application.

FIG. 8 is a schematic diagram of an architecture of a power supply system according to an embodiment of this application. As shown in FIG. 8, the power supply system may further include an “OR” circuit. A first end of the “OR” circuit is connected to the detection and hold control circuit 204, a second end of the “OR” circuit is connected to the controller 203, and a third end of the “OR” circuit is connected to the second power supply circuit 202. In this way, when there is a first wake-up signal, the second power supply circuit 202 may be connected, and when there is a second wake-up signal, the second power supply circuit may also be connected. Alternatively, the “OR” circuit may be used as a part of the second power supply circuit 202. In this case, the second power supply circuit includes a high-side driver and the “OR” circuit.

In addition, as shown in FIG. 8, the power supply system may further include a ground capacitor and a series resistor. A first end of the series resistor is connected to the detection and hold control circuit 204, a second end is connected to the controller 203 and a first end of the ground capacitor, and a second end of the ground capacitor is grounded. In this way, after receiving the first wake-up signal, the series resistor may trigger the controller 203 to reset at a low level, to send a first hibernation signal and a second wake-up signal. This implements switching from a small current to a large current.

Figure 9:
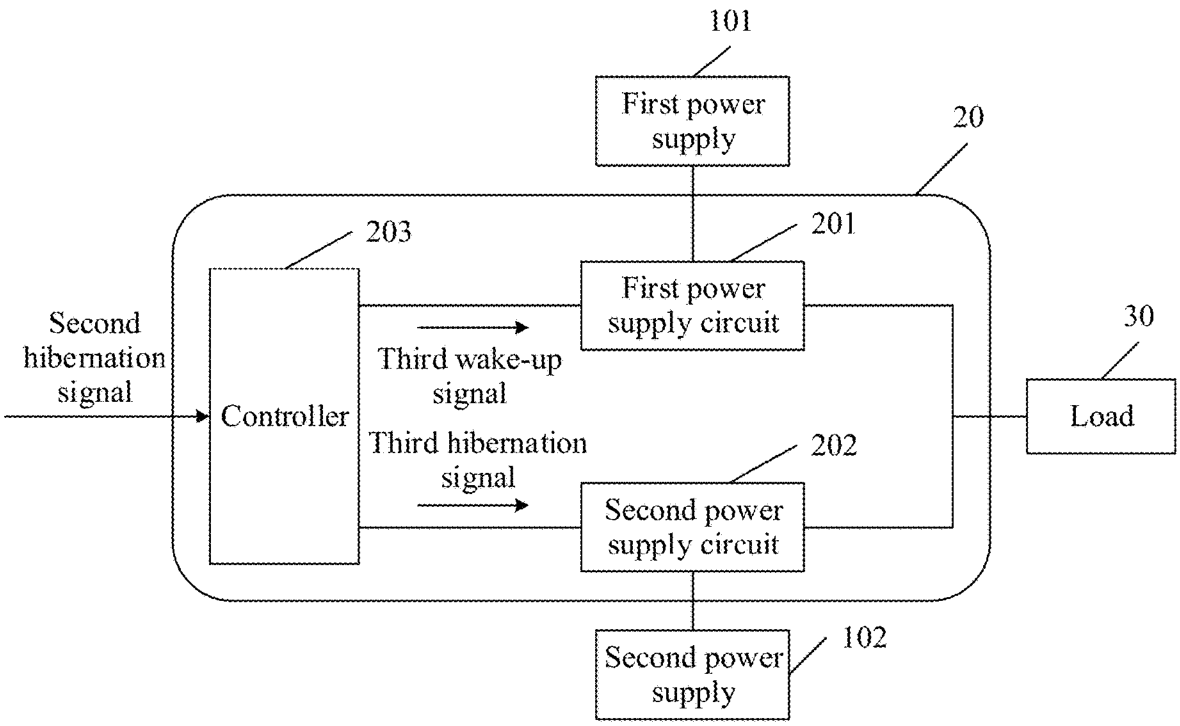
FIG. 9 is a schematic diagram of an architecture of a power supply system according to an embodiment of this application.

FIG. 9 is a schematic diagram of an architecture of a power supply system according to an embodiment of this application. As shown in FIG. 9, the controller 203 may receive a second hibernation signal from outside the power supply system 20. The second hibernation signal may indicate a hibernation signal from outside the power supply system 20. In an example, after the vehicle is stalled, a control component in the vehicle may generate and send the second hibernation signal to the controller 203 in the power supply system 20. The controller 203 sends a third wake-up signal to the first power supply circuit 201 and a third hibernation signal to the second power supply circuit 202, and enters a hibernation state when receiving the second hibernation signal.

The third wake-up signal may represent a wake-up signal generated by the controller 203 in response to the second hibernation signal. The first power supply circuit 201 is connected when receiving the third wake-up signal. The third hibernation signal may represent a hibernation signal generated by the controller 203 in response to the second hibernation signal. The second power supply circuit 202 is disconnected when receiving the third hibernation signal. In this way, before entering the hibernation state, the controller switches a large current to a small current, so that after the controller enters the hibernation state, power can still be supplied to the load.

Figure 10:
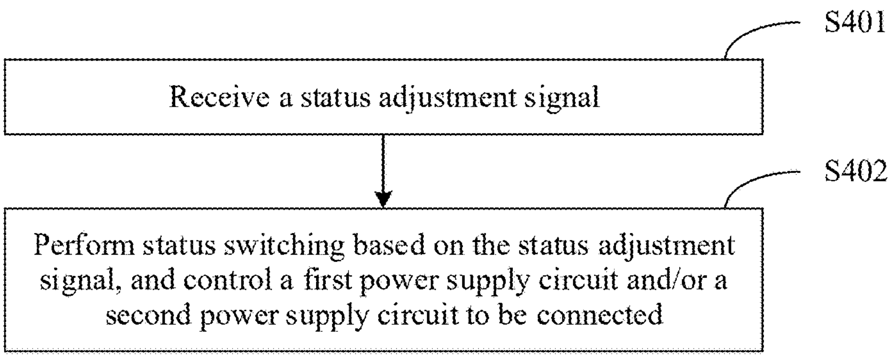
FIG. 10 is a flowchart of a control method according to an embodiment of this application.

FIG. 10 is a flowchart of a control method according to an embodiment of this application. The method may be applied to a controller, for example, the controller 203 in any power supply system shown in FIG. 2 to FIG. 6. As shown in FIG. 10, the method may include the following operations.

Operation S401: Receive a status adjustment signal.

The status adjustment signal may indicate the controller to enter a hibernation state or a working state. A status adjustment signal that indicates the controller to enter the hibernation state may be referred to as a hibernation signal (for example, a second hibernation signal from outside the power supply system), and a signal that indicates the controller to enter the working state may be referred to as a wake-up signal (for example, a first wake-up signal from a detection and hold control circuit inside the power supply system).

Operation S402: Perform status switching based on the status adjustment signal, and control a first power supply circuit and/or a second power supply circuit to be connected.

An output current of the first power supply circuit is a first current when the first power supply circuit is connected, an output current of the second power supply circuit is a second current when the second power supply circuit is connected, and the first current is less than the second current.

In an embodiment, operation S402 may include: sending a wake-up signal to the first power supply circuit and a hibernation signal to the second power supply circuit when the status adjustment signal indicates the controller to enter the hibernation state, so that the first power supply circuit is connected and the second power supply circuit is disconnected; and entering the hibernation state.

The controller needs to enter the hibernation state when receiving a hibernation signal. In this embodiment of this application, before entering the hibernation state, the controller sends the wake-up signal to the first power supply circuit and the hibernation signal to the second power supply circuit to implement switching from a large current to a small current. In this way, after the controller enters the hibernation state, power can still be supplied to a load.

In an embodiment, operation S402 may include: entering the working state when the status adjustment signal indicates the controller to enter the working state; and sending a hibernation signal to the first power supply circuit and a wake-up signal to the second power supply circuit, so that the first power supply circuit is disconnected and the second power supply circuit is connected.

The controller enters the working state when receiving a wake-up signal. That the controller enters the working state means that the load also enters the working state. Therefore, after entering the working state, the controller sends the hibernation signal to the first power supply circuit and sends the wake-up signal to the second power supply circuit to implement switching from a small current to a large current, so that the load can work normally.

In this embodiment of this application, a quiescent current and a quiescent loss during vehicle hibernation are reduced by performing smooth switching between the small current and the large current.

APPLICATION EXAMPLES

After the vehicle is stalled, the control component in the vehicle generates and sends the second hibernation signal to the controller in the power supply system. When receiving the second hibernation signal, the controller sends the third wake-up signal to the first power supply circuit and the third hibernation signal to the second power supply circuit and enters the hibernation state. The first power supply circuit is connected when receiving the third wake-up signal, and the second power supply circuit is disconnected when receiving the third hibernation signal. In this case, the vehicle is stalled, the controller in the power supply system hibernates, the first power supply circuit is connected, the second power supply circuit is disconnected, and the first power supply circuit supplies the small current to the load. In this way, after the vehicle is stalled, the crash sensor in the vehicle may still perform crash detection, a door in the vehicle may be opened, and a camera in the vehicle may still photograph a person or an object close to the vehicle.

When the load needs to work normally (for example, when the crash sensor senses a crash, when the door is opened, or when the camera is photographing), the first current increases.

In an example, the detection and hold control circuit triggers the hold circuit to generate the first wake-up signal within hundreds of microseconds, and send the first wake-up signal to the controller and the second power supply circuit when detecting that the first current is greater than the first threshold. The controller enters the working state when receiving the first wake-up signal and sends the first hibernation signal to the first power supply circuit. The first power supply circuit is disconnected when receiving the first hibernation signal, and the second power supply circuit is connected when receiving the first wake-up signal. In this case, the power supply system supplies a large current to the load, and the load works normally.

In another example, the detection and hold control circuit triggers the hold circuit to generate the first wake-up signal within hundreds of microseconds, and send the first wake-up signal to the controller and the second power supply circuit when detecting that the first current is greater than the first threshold. The controller enters the working state when receiving the first wake-up signal, and sends the first hibernation signal to the first power supply circuit and the second wake-up signal to the second power supply circuit. The first power supply circuit is disconnected when receiving the first hibernation signal. The second power supply circuit is connected when receiving the second wake-up signal. In this case, the power supply system supplies a large current to the load, and the load works normally.

Figure 11:
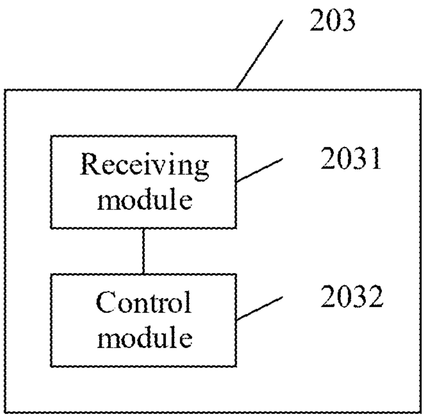
FIG. 11 is a schematic diagram of a structure of a control apparatus according to an embodiment of this application.

FIG. 11 is a schematic diagram of a structure of a control apparatus according to an embodiment of this application. As shown in FIG. 11, the controller 203 may include:

a receiving module 2031, configured to receive a status adjustment signal, and the status adjustment signal indicates the controller to enter a hibernation state or a working state; and a control module 2032, configured to perform status switching and control connection of a first power supply circuit and/or a status of a second power supply circuit based on the status adjustment signal, and an output current of the first power supply circuit is a first current when the first power supply circuit is connected, an output current of the second power supply circuit is a second current when the second power supply circuit is connected, and the first current is less than the second current.

In one embodiment, the control module is further configured to:

send a wake-up signal to the first power supply circuit and a hibernation signal to the second power supply circuit when the status adjustment signal indicates the controller to enter the hibernation state, so that the first power supply circuit is connected and the second power supply circuit is disconnected; and enter the hibernation state.

In one embodiment, the control module is further configured to:

enter the working state when the status adjustment signal indicates the controller to enter the working state; and send the hibernation signal to the first power supply circuit and the wake-up signal to the second power supply circuit, so that the first power supply circuit is disconnected and the second power supply circuit is connected.

In this embodiment of this application, when power is supplied to the load, smooth switching between a small current and a large current can be implemented, so that a small quiescent current can be supplied to the load, and a large current required for normal working can also be provided to the load.

An embodiment of this application provides a vehicle, including a first power supply, a second power supply, a load, and the foregoing power supply system.

An embodiment of this application provides an electronic device, including a processor and a memory configured to store executable instructions of the processor. The processor is configured to implement the foregoing method when executing the instructions.

An embodiment of this application provides a nonvolatile computer-readable storage medium. The nonvolatile computer-readable storage medium stores computer program instructions, and when the computer program instructions are executed by a processor, the foregoing method is implemented.

An embodiment of this application provides a computer program product, including computer-readable code or a nonvolatile computer-readable storage medium that carries computer-readable code. When the computer-readable code is run in a processor of an electronic device, the processor in the electronic device performs the foregoing method.

The computer-readable storage medium may be a tangible device that may retain and store instructions for use by an instruction execution device. The computer-readable storage medium may be, for example, (but is not limited to) an electrical storage device, a magnetic storage device, an optical storage device, an electromagnetic storage device, a semiconductor storage device, or any suitable combination thereof. More examples (a non-exhaustive list) of the computer-readable storage medium include: a portable computer disk, a hard disk, a random access memory (RAM), a read-only memory (ROM), an erasable programmable read-only memory (EPROM, or flash memory), a static random access memory (SRAM), a portable compact disc read-only memory (CD-ROM), a digital versatile disc (DVD), a memory stick, a floppy disk, a mechanical coding device, for example, a punching card or a groove protrusion structure that stores instructions, and any suitable combination thereof.

The computer-readable program instructions or code described herein may be downloaded from a computer-readable storage medium to each computing/processing device, or downloaded to an external computer or an external storage device over a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this application may be assembly instructions, instruction set architecture (ISA) instructions, machine instructions, machine-related instructions, microcode, firmware instructions, status setting data, or source code or target code written in one or any combination of more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer over any type of network, including a local area network (LAN) or a wide area network (WAN), or may be connected to an external computer (for example, connected by using an Internet service provider over the Internet). In some embodiments, an electronic circuit, for example, a programmable logic circuit, a field programmable gate array (FPGA), or a programmable logic array (PLA), is customized by using status information of computer-readable program instructions. The electronic circuit may execute the computer-readable program instructions, to implement various aspects of this application.

The various aspects of this application are described herein with reference to the flowcharts and/or the block diagrams of the method, the apparatus (system), and the computer program product according to embodiments of this application. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a particular manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implements functions/actions specified in one or more blocks in the flowcharts and/or the block diagrams.

The flowcharts and the block diagrams in the appended drawings illustrate system architectures, functions, and operations of implementations of apparatuses, systems, methods, and computer program products according to a plurality of embodiments of this application. In this regard, each block in the flowcharts or block diagrams may represent a module, a program segment, or a part of the instructions, and the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an ASIC (application-specific integrated circuit)) that performs a corresponding function or action, or may be implemented by a combination of hardware and software, for example, firmware.

Although the present disclosure is described with reference to embodiments, in a process of implementing the present disclosure that claims protection, a person skilled in the art may understand and implement another variation of the disclosed embodiments by viewing the accompanying drawings, the disclosed content, and the appended claims. In the claims, "comprising" does not exclude another component or another operation, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Embodiments of this application are described above. The foregoing descriptions are examples, are not exhaustive, and are not limited to the disclosed embodiments. Many modifications and changes are clear to a person of ordinary skill in the art without departing from the scope of the described embodiments. The selection of terms used in this specification is intended to best explain the principles of embodiments, practical application, or improvements to technologies in the market, or to enable another person of ordinary skill in the art to understand embodiments disclosed in this specification.

What is claimed is:

1. A power supply system, comprising:

a first power supply circuit connected to a first power supply and a load;

a second power supply circuit connected to a second power supply and the load;

a detection and hold control circuit connected to the first power supply, the second power supply, and the load; and a controller connected to the detection and hold control circuit, the first power supply circuit, and the second power supply circuit, wherein the controller controls the first power supply circuit and/or the second power supply circuit to be connected to the load;

an output current of the first power supply circuit is a first current when the first power supply circuit is connected;

an output current of the second power supply circuit is a second current when the second power supply circuit is connected and the first current is less than the second current;

the detection and hold control circuit sends a first wake-up signal to the controller and the second power supply circuit when detecting that the first current is greater than or equal to a first threshold;

the controller enters a working state when receiving the first wake-up signal and sends a first hibernation signal to the first power supply circuit;

the first power supply circuit is disconnected when receiving the first hibernation signal; and the second power supply circuit is connected to the load when receiving the first wake-up signal.

2. The power supply system according to claim 1, wherein the detection and hold control circuit comprises:

a sampling resistor; and a voltage comparator, wherein a first end of the sampling resistor is connected to the first power supply circuit and a first end of the voltage comparator;

a second end of the sampling resistor is connected to the load and a second end of the voltage comparator; and a third end of the voltage comparator is connected to the controller and the second power supply circuit; and the voltage comparator:

obtains a first voltage at the first end of the sampling resistor and a second voltage at the second end of the sampling resistor;

determines a voltage difference between the first voltage and the second voltage;

determines the first current based on the voltage difference and a resistance value of the sampling resistor; and outputs the first wake-up signal to the controller and the second power supply circuit when the first current is greater than or equal to the first threshold.

3. The power supply system according to claim 1, wherein, when the controller enters a working state when receiving the first wake-up signal, the controller sends a second wake-up signal to the second power supply circuit; and the second power supply circuit is connected to the load when receiving the second wake-up signal.

4. The power supply system according to claim 3, wherein the detection and hold control circuit comprises:

a sampling resistor; and a voltage comparator, wherein a first end of the sampling resistor is connected to the first power supply circuit and a first end of the voltage comparator;

a second end of the sampling resistor is connected to the load and a second end of the voltage comparator; and a third end of the voltage comparator is connected to the controller; and the voltage comparator:

obtains a first voltage at the first end of the sampling resistor and a second voltage at the second end of the sampling resistor;

determines a voltage difference between the first voltage and the second voltage;

determines the first current based on the voltage difference and a resistance value of the sampling resistor; and outputs the first wake-up signal to the controller when the first current is greater than or equal to the first threshold.

5. The power supply system according to claim 1, wherein when receiving a second hibernation signal from outside the power supply system, the controller sends a third wake-up signal to the first power supply circuit and a third hibernation signal to the second power supply circuit and enters a hibernation state;

the first power supply circuit is connected to the load when receiving the third wake-up signal; and the second power supply circuit is disconnected from the load when receiving the third hibernation signal.

6. The power supply system according to claim 1, wherein the first power supply and the second power supply are different power supplies.

7. The power supply system according to claim 1, wherein the first power supply circuit comprises at least one of:

a metal-oxide-semiconductor field-effect transistor;

a triode;

a passive switch; or a relay; and the second power supply circuit comprises a high-side driver.

8. The power supply system according to claim 7, wherein the second power supply circuit further comprises an "OR" circuit, wherein a first input end and a second input end of the "OR" circuit are respectively configured to receive the first wake-up signal and a second wake-up signal; and an output end of the "OR" circuit is connected to the high-side driver; or the second power supply circuit further comprises:

a first diode; and a second diode, wherein one end of the first diode receives the first wake-up signal;

another end of the first diode is connected to the high-side driver;

one end of the second diode receives the second wake-up signal; and another end of the second diode is connected to the high-side driver.

9. The power supply system according to claim 1, wherein the detection and hold control circuit comprises:

a first sampling resistor;

a second sampling resistor; and a triode, wherein a first end of the first sampling resistor is connected to the first power supply circuit and a first end of the second sampling resistor;

a second end of the first sampling resistor is connected to the load and a base of the triode;

a second end of the second sampling resistor is connected to an emitter of the triode; and a collector of the triode is connected to the controller and the second power supply circuit.

10. The power supply system according to claim 9, wherein the collector of the triode is further connected to the first end of the second sampling resistor through a capacitor.

11. The power supply system according to claim 8, wherein the triode is an NPN-type triode.

12. A vehicle, wherein the vehicle comprises:

a first power supply;

a second power supply;

a load; and a power supply system, comprising:

a first power supply circuit connected to the first power supply and the load;

a second power supply circuit connected to the second power supply and the load;

a detection and hold control circuit connected to the first power supply, the second power supply, and the load; and a controller connected to the detection and hold control circuit, the first power supply circuit, and the second power supply circuit, wherein the controller controls the first power supply circuit and/or the second power supply circuit to be connected to the load;

an output current of the first power supply circuit is a first current when the first power supply circuit is connected;

an output current of the second power supply circuit is a second current when the second power supply circuit is connected and the first current is less than the second current;

the detection and hold control circuit sends a first wake-up signal to the controller and the second power supply circuit when detecting that the first current is greater than or equal to a first threshold;

the controller enters a working state when receiving the first wake-up signal and sends a first hibernation signal to the first power supply circuit;

the first power supply circuit is disconnected when receiving the first hibernation signal; and the second power supply circuit is connected to the load when receiving the first wake-up signal.

13. The vehicle according to claim 12, wherein the detection and hold control circuit comprises:

a sampling resistor; and a voltage comparator, wherein a first end of the sampling resistor is connected to the first power supply circuit and a first end of the voltage comparator;

a second end of the sampling resistor is connected to the load and a second end of the voltage comparator; and a third end of the voltage comparator is connected to the controller and the second power supply circuit; and the voltage comparator:

obtains a first voltage at the first end of the sampling resistor and a second voltage at the second end of the sampling resistor;

determines a voltage difference between the first voltage and the second voltage;

determines the first current based on the voltage difference and a resistance value of the sampling resistor; and outputs the first wake-up signal to the controller and the second power supply circuit when the first current is greater than or equal to the first threshold.

14. The vehicle according to claim 12, wherein, when the controller enters a working state when receiving the first wake-up signal, the controller sends a second wake-up signal to the second power supply circuit; and the second power supply circuit is connected to the load when receiving the second wake-up signal.

15. The vehicle according to claim 14, wherein the detection and hold control circuit comprises:

a sampling resistor; and a voltage comparator, wherein a first end of the sampling resistor is connected to the first power supply circuit and a first end of the voltage comparator;

a second end of the sampling resistor is connected to the load and a second end of the voltage comparator; and a third end of the voltage comparator is connected to the controller; and the voltage comparator:

obtains a first voltage at the first end of the sampling resistor and a second voltage at the second end of the sampling resistor;

determines a voltage difference between the first voltage and the second voltage;

determines the first current based on the voltage difference and a resistance value of the sampling resistor; and outputs the first wake-up signal to the controller when the first current is greater than or equal to the first threshold.

16. The vehicle according to claim 12, wherein when receiving a second hibernation signal from outside the power supply system, the controller sends a third wake-up signal to the first power supply circuit and a third hibernation signal to the second power supply circuit and enters a hibernation state;

the first power supply circuit is connected to the load when receiving the third wake-up signal; and the second power supply circuit is disconnected from the load when receiving the third hibernation signal.

17. The vehicle according to claim 12, wherein the first power supply and the second power supply are different power supplies.

* * * * *